United States Patent [15] 3,693,074
Höller et al. [45] Sept. 19, 1972

[54] MAGNETIC DETECTION OF SURFACE FAULTS IN AN ELONGATED METAL BODY BY PASSING ELECTRIC-CURRENT PULSES THERETHROUGH WHILE A MAGNETIC TAPE IS DISPLACED ALONG THE SURFACE OF THE BODY

[72] Inventors: Paul Höller, Oberhauser; Paul Scholten, Essen-Frintrop, both of Germany

[73] Assignee: Huttenwerk Oberhausen A.G., Oberhausen, Germany

[22] Filed: Dec. 31, 1970

[21] Appl. No.: 103,328

Related U.S. Application Data

[63] Continuation-in-part of Ser. No. 775,665, Nov. 14, 1968, abandoned.

[30] Foreign Application Priority Data

Nov. 15, 1967 Germany..........P 16 48 517.9

[52] U.S. Cl....................................................324/37
[51] Int. Cl. ..............................................G01r 33/12
[58] Field of Search....................................324/37, 38

[56] References Cited

UNITED STATES PATENTS 2,764,733  9/1956   De Forest.....................324/38
2,979,655  4/1961   De Forest.....................324/37
2,994,032  7/1961   Hansen.........................324/37
3,534,258  10/1970  Forster........................324/37

Primary Examiner—Robert J. Corcoran
Attorney—Karl F. Ross

[57] ABSTRACT

A method of detecting the location and extent of superficial faults, especially cracks, and for measuring the depths of such cracks in bars, billets, blooms, ingots, rods and tubes, especially of noncircular cross section. An electric current is passed axially through the elongated metallic body, and the magnetic flux of field (crossflux) generated by the passage of the electric current through the body is detected along the surface thereof. To avoid or reduce the effects of the edges of the noncircular body upon the detected magnetic field strength or flux and, therefore, to reduce the possibility that cracks in the region of these edges will be undetected or poorly evaluated, the electric current passed axially through the bar is pulsed with the pulse shape being selected such that, in relation to the geometry of the bar, cracks in the surface in the region of the edges are detected.

7 Claims, 5 Drawing Figures

Paul Höller
Paul Scholten
INVENTORS.

PATENTED SEP 19 1972  3,693,074

INVENTORS:
Paul Höller
Paul Scholten
BY
Karl J. Ross
Attorney

MAGNETIC DETECTION OF SURFACE FAULTS IN AN ELONGATED METAL BODY BY PASSING ELECTRIC-CURRENT PULSES THERETHROUGH WHILE A MAGNETIC TAPE IS DISPLACED ALONG THE SURFACE OF THE BODY

CROSS-REFERENCE TO CO-PENDING APPLICATION

This is a continuation-in-part of our commonly assigned patent application Ser. No. 775,665 filed on Nov. 14, 1968, now abandoned.

FIELD OF THE INVENTION

Our present invention relates to a method of and to an apparatus for the detection of surface cracks and other faults in bars, billets, blooms, rods, tubes and other elongated metallic bodies of noncircular cross section and having longitudinal edges extending in the direction of their major dimension, which edges may be rounded; the invention also relates to a method of and to an apparatus for the detection of the depth of such surface cracks as well as to a system for locating them in the surface of the body. Still further, the invention deals with improvements in magnetographic nondestructive fault detection and evaluation in iron and other metallic bodies.

BACKGROUND OF THE INVENTION

While numerous nondestructive testing methods have been proposed for the detecting, the locating and evaluating of surface cracks, fissures, crevices and defect structures in metallic bodies, especially elongated bodies composed of ferromagnetic material (iron or iron-family metals), it has been found to be economical, both with respect to equipment, cost and labor expenses, to use magnetic methods for the evaluation of superficial faults of the character described.

In earlier magnetographic techniques, a unidirectional continuous electric current (direct current or d.c.) is passed longitudinally through the bar, thereby forming a magnetic field in a plane perpendicular to the bar with circular or peripheral magnetization. When the bar has longitudinal cracks, a disequilibration of the magnetic field is manifested and a stray or crossflux results; the stray flux has an amplitude which, for constant magnetization of the test body and given crack configuration and geometry, is proportional to the depth of the crack.

In magnetographic testing methods of this general type, the stray flux or scattered flux is not measured directly in the usual system but is picked up by an endless band running along the surface of the test body for temporary storage whereupon the band is scanned by a magnetic read-out and the output thereof is delivered to a recording, measuring or indicating device.

When the cross section of the test body is circular, the lines of force and induced magnetic field are more or less axially symmetrical so that defects or cracks are readily detected using direct-current energization. It has been found, however, that the same does not hold true when the edges of the test body are angular, beveled or rounded. In these cases, the magnetic lines of force which run parallel to the surface of the body are nonhomogeneous and the deviations of the magnetic field from a uniform condition are large relative to the magnitude of the stray flux. In fact, the magnetization direction becomes then a function of position along the periphery and varies as a function of the tangent to this periphery. For example, a test body having a square cross section with rounded longitudinal edges having a radius of curvature equal to one-tenth of the width of each of the body's sides manifests considerable distortion with up to 70 percent loss of signal to the rounded corners with a magnetic field amplitude of 80 Oersted in the field center, so that for some size faults the indication at the edge will be only 2 percent of that at the center.

Attempts to increase the field strength to make up for the loss of signal at the rounded corners have proved to be unsatisfactory because the high magnetic intensity then brings the recording band to saturation. Consequently, efforts to use d.c. continuous energization in magnetographic techniques have proved to be unsatisfactory. Further efforts to remove this drawback by varying the technique for connecting the test body to the continuous electrical supply have also proved insufficient.

It is also known to magnetize the body with alternating current, which raises the sensitivity at the edge, with the above-mentioned 80 Oersted field strength, to 20 percent of that at the center. However, alternating current tends to erase the tape so that half-wave or full-wave rectified alternating current is used. Once again, this solution increases sensitivity at the edges noticeably, but it is still necessary to use a pulse train with an overall direct-current component that is so large that it creates an overly strong field at the center of the body's sides.

OBJECTS OF THE INVENTION

It is, therefore, the principal object of the present invention to provide a method of magnetographically determining the presence and location of superficial cracks and similar defect structures in ferromagnetic billets, blooms, rods and the like of noncircular cross section.

Another object of this invention is to provide improved apparatus for determining the presence of such cracks and evaluating both location and depth thereof.

Still another object of the invention is to provide an improved nondestructive fault-detection method and apparatus which will extend the principles originally set forth in the aforementioned application.

SUMMARY OF THE INVENTION

We have now found that it is possible to overcome the aforedescribed disadvantages and to obtain a substantially homogeneous tangential magnetization along the periphery of a test body with noncircular section by surprisingly doing away with the continuous electrical energization hitherto employed and providing a pulsed signal (direct current) of a frequency and a pulse shape designed to render the cracks at rounded corners more readily detectable.

We have surprisingly discovered that there is an optimum pulse train for each body, depending on its shape. It is important to distinguish here between two terms, apparent frequency and cadence frequency. Apparent frequency here applies to the frequency a pulse appears to have by virtue of its shape and duration, so that if a pulse has a duration of, say, 0.1 second it would have an apparent frequency of 5 Hz, as if it were produced for example, by half-wave rectification of 5 Hz alternating current. Cadence frequency here means the true or pulse-sequence frequency, such that pulses appearing every 0.05 seconds would have a cadence frequency of 20 Hz. Thus, in a fault-detection system wherein a sensing unit of a predetermined length in the direction of travel or mutual movement between the unit and the body (since either can move or be stationary) with a magnetic tape passing over the head of the unit in the direction of travel at the rate of mutual displacement, a pulse train having a cadence frequency equal to or greater than the quotient of the displacement rate divided by detection length (i.e., length of juxtaposition of tape with bar) is used according to the present invention.

According to another feature of the present invention, a pulse series is used which has the above-given cadence frequency, and a substantially greater apparent frequency. Thus, a pulse train having an apparent frequency of several hundred Hertz is advantageous.

Another feature of this invention is the step of setting the cadence frequency as defined above, and then increasing the apparent frequency of the pulse train from a frequency equal to the cadence frequency while comparing the relative magnetic-field strengths on the test body near the center of one side and near the edge. It will be found that at a certain apparent frequency the field strength at the edge will reach a maximum level, relative to the field strength near the center of a side. Above and below this frequency the range of frequency variation from one part of the body to another increases. As a general rule, the more irregular the test body or workpiece is in cross section, the higher this optimum frequency is; but it is virtually impossible to give a more exact relationship due to the complications brought about by the skin effect. Once the cadence and apparent frequencies are determined for the test body, all of the bodies of the same cross section are tested at these frequencies.

It has been found, for example, that sinusoidal direct-current pulses at a cadence frequency of 20 to 100 Hz, preferably 50 to 60 Hz inclusive, provide best results for the scanning of test bodies having rounded-corner cross sections. With angular corners, correspondingly angular flanks are preferred on the pulses of the energizing train. Thus, square-wave pulses are preferred when the corners form right angles. Experiments have shown that the use of such d.c. pulses substantially completely eliminates the signal loss to the rounded corners and practically completely eliminates the influence of these corners with respect to the tangential magnetization. There is, however, a reduction in the magnetic induction in a direction normal to the surface toward the interior of the test body.

Since, as a rule, a quantitative determination of a depth of the cracks only to about 2 mm is of interest and the tolerances of variation in the position of the magnetic band and the roughness of the surface limit the detectability of cracks to a depth of up to, say, a hundreth of a mm, it has been found to be necessary to provide peripheral magnetization in a sheath only along the surface zones of the body to a depth of several millimeters. Indeed, it has, surprisingly, been found that the use of pulsating direct current as previously described results in such a magnetic sheath in which at least part of the flux is diverted inwardly by the cracks. As a result, with a cadence frequency of 20 to 100 Hz and an apparent frequency set for the particular bar shape, a substantial improvement in the homogeneity of the magnetic sheath parallel to the surface as well as in the orientation of the magnetic field along the surface can be attained by comparison with continuous direct current energization.

DESCRIPTION OF THE DRAWING

The above and other objects, features and advantages of the present invention will become more readily apparent from the following description, reference being made to the accompanying drawing in which.

SPECIFIC DESCRIPTION

Figure 1:
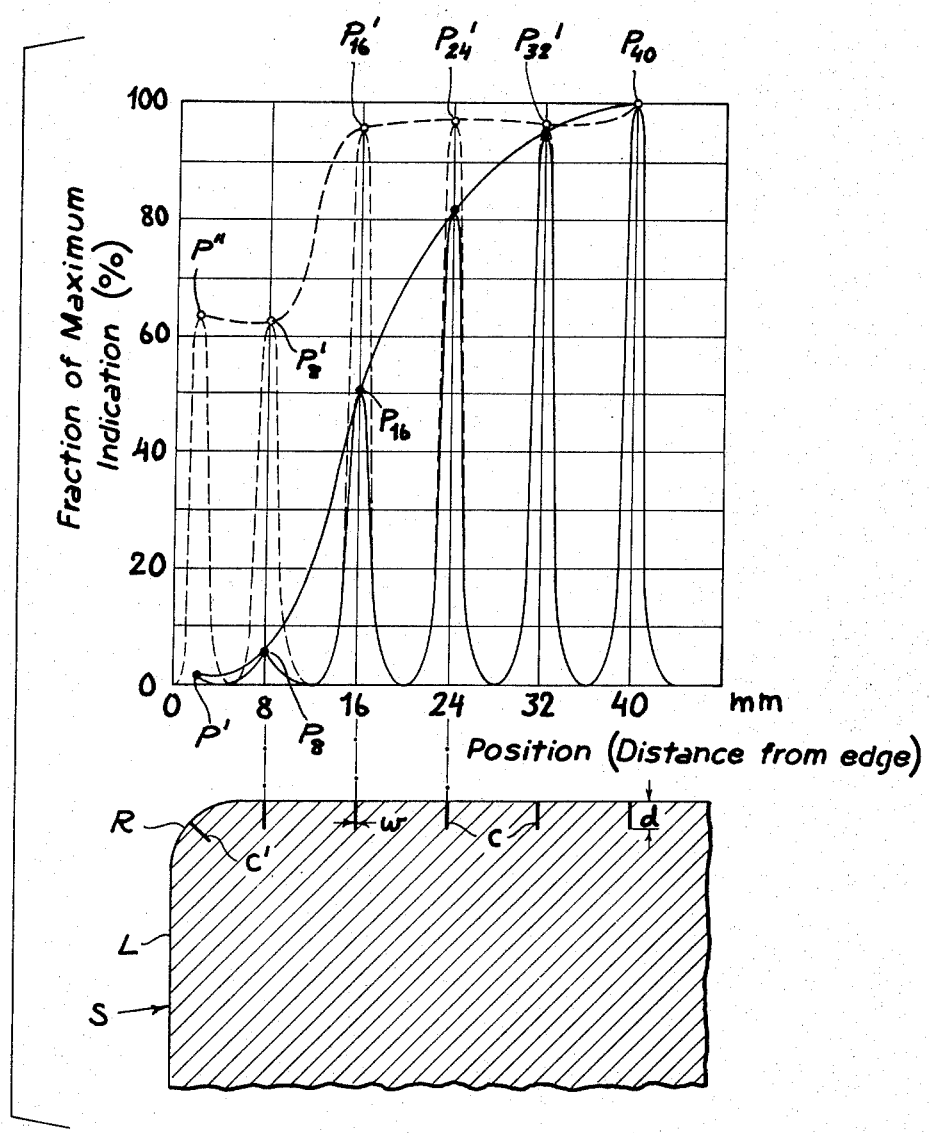
FIG. 1 shows the position of a number of cracks C formed in a test body S plotted along the abscissa in terms of the distance from the edge L of the body in millimeters against the fraction of the maximum indication assigned to the depth $d$ of the cracks C as generated by the measuring apparatus and plotted along the ordinate.

When pulsating direct current is used in accordance with the present invention (broken line in FIG. 1), the peaks $P''$, $P_8'$, $P_{16}'$, $P_{24}'$ and $P_{32}'$ reach close to their true indications much earlier in the scanning of the width of the bar. As FIG. 1 shows, the result is a substantial improvement in the indication of the position and depth of the cracks substantially independently from location with respect to the edge. The pulses represented in FIG. 1, of course, are the output of the measuring unit and correspond to locations of the measured magnetization as recorded on the band.

Figure 2:
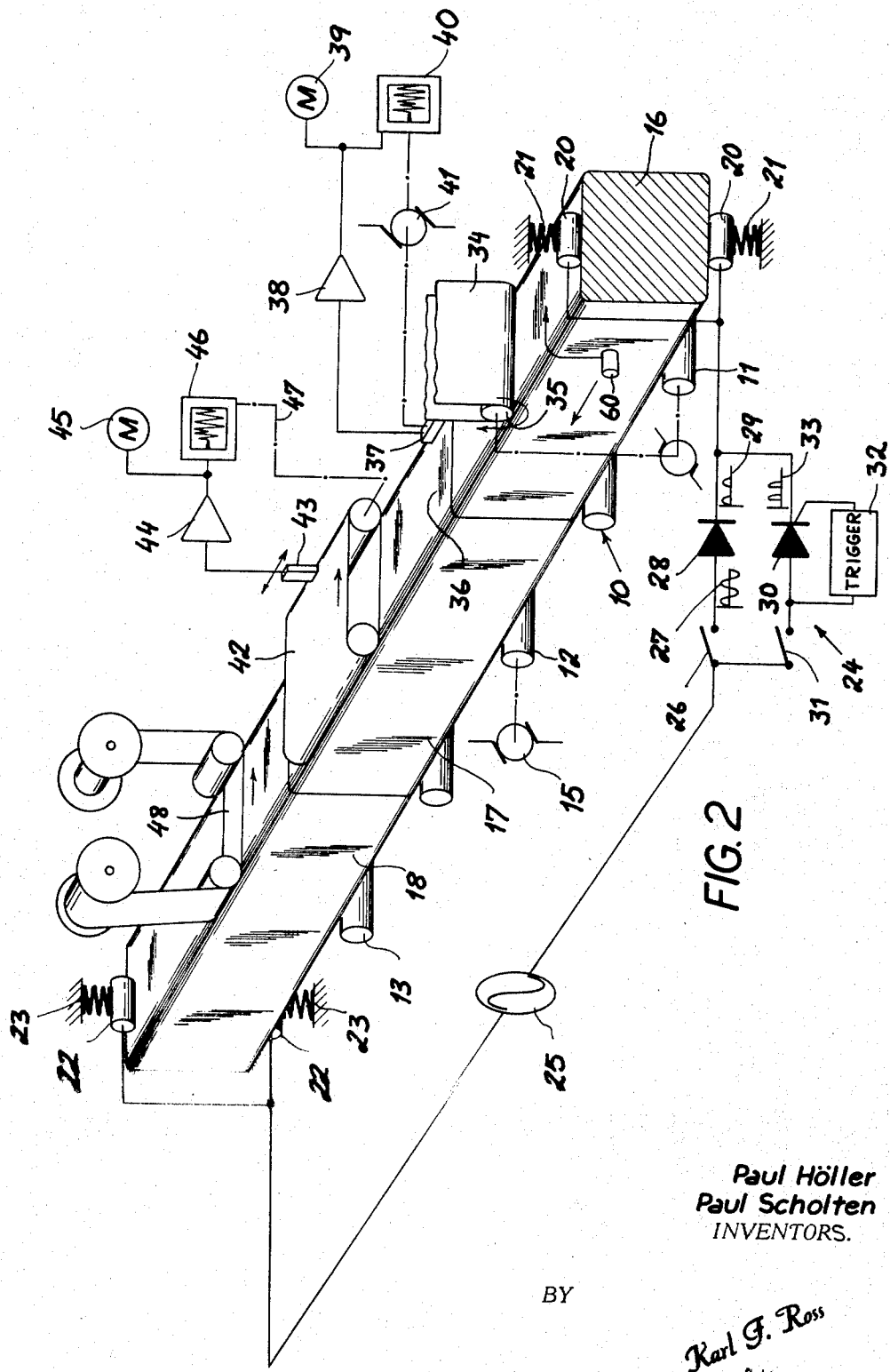
FIG. 2 is a perspective view diagrammatically illustrating an apparatus for carrying out the present invention.

In FIG. 2, we have shown an apparatus for carrying out the present invention in practice. This apparatus comprises a conveyor 10 having a plurality of rollers 11, 12 and 13 respectively driven by the motors 14, 15 etc. to advance the bars 16, 17 and 18 in the direction of arrow 19. Motor 14 is designed to accelerate the trailing band 16 so that, at its forward end, it is forced longitudinally against the preceding bar 17 which, in turn, is forced against the leading bar 18, a pair of rollers 20 are urged by springs 21 against the upstream bar 16 while another pair of rollers 22 are held by springs 23 against the downstream bar 18 to apply the pulsating electric current of a source 24 to the elongated bars which are composed of ferromagnetic material and are of square cross section with rounded corners. The forceful contact of the bars in end-to-end relationship ensures electrical continuity.

The source of energizing current can consist of the usual line-current-source 25 which is adapted to supply 20 to 100 Hz sinusoidal alternating current at 1,000 to 2,500 amp. via switch 26 as represented by the wave form 27 ahead of the half-wave rectifier 28 whose half-wave rectifier output 29 is delivered to the bars. In the event the magnetic band has magnetization or hysteresis characteristics which would give rise to a simple a.c. magnetization of the recording medium, we may provide a solid-state controlled rectifier switching device 30, connectable in series with the source 25 by a switch 31 and triggerable by a timer 32 of conventional construction to produce a wave form in which the flanks of the d.c. pulses are modified as represented at 33.

Several recording systems are shown for the apparatus of FIG. 2 including an endless band 34 which passes under the roller 35 along the surface 36 of the bars 16–18 which are formed with longitudinal cracks, for example as shown in FIG. 1. While the magnetic band 34 may be removed after recording the condition of the surface of the bar and stored or brought to a read-out station immediately after recording the presence and depth of the cracks in terms of flux scattering, we have represented the read-out means by a head 37 which is connected to the usual amplifier 38 and to a meter 39 (e.g., a galvanometer or oscilloscope or a strip recorder 40) in which the pulses (see the graph of FIG. 1) are recorded as a function of the position of the head 37. A servomotor 41 connects the head 37 with the pen carriage of the recorder 40. The motor 14 which drives the bar 16 is coupled with the band drive roller 35 for synchronous movement of the band 34.

When intermittent movement of the bars is possible, the band may run transversely of the direction of displacement 19 as shown at 42. Here the band is scanned by a pick-up head 43 which energizes the amplifier 44, the depth meter 45 and the recorder 46 as previously described. The recorder is here advanced in step with the band 42 as represented by the line 47. The head 43 can sweep repeatedly parallel to the longitudinal edges of the bars. The magnetic field intensity at the surface of the body can also be measured by a magnetic tape 48 which sweeps across the bars and can be stored for later translation into magnetic indications of the presence or absence of cracks.

Figure 3:
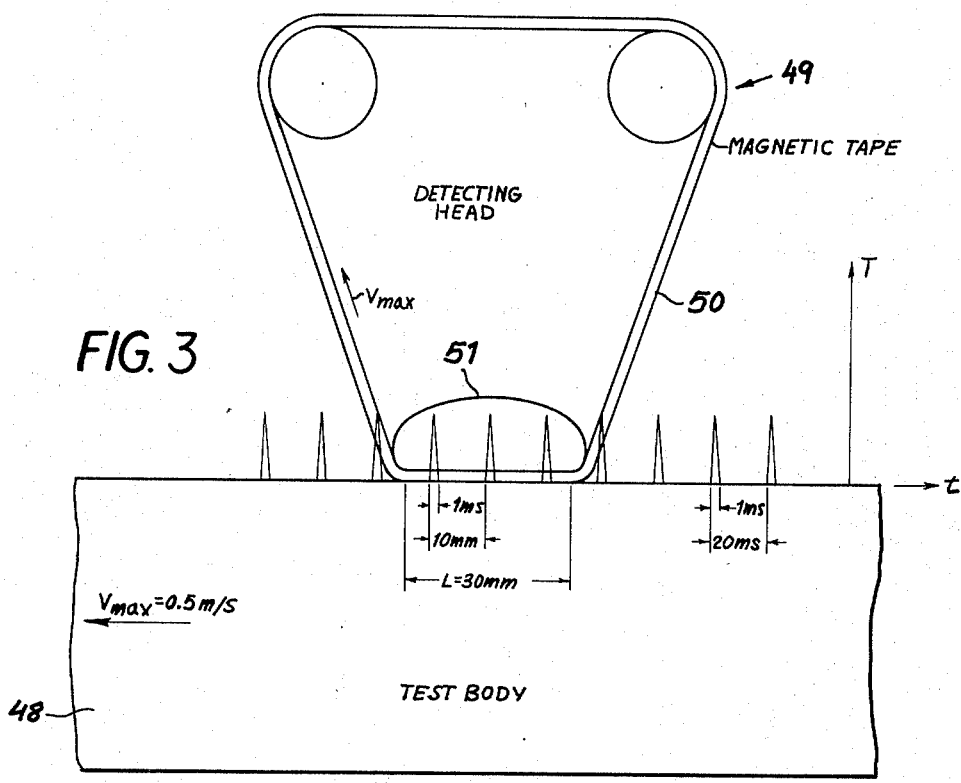
FIG. 3 is a largely diagrammatic view illustrating principles of the present invention.

FIG. 3 shows a test body 48 from the side which is moving from right to left at a speed $V_{max}$ of 0.5 meter per second. A detecting head 49 is provided over which is spanned a loop 50 of magnetic tape. The tape engages the bar for a length L of 30 millimeters since this is the longitudinal (relative to the longitudinal axis of the elongated body 48) length of a foot 51 over which the loop 50 is spanned. This loop 50 is either engaged by the body 48 so that it also moves at the speed $V_{max}$, or it is driven at this speed in the case when it does not quite engage the body but merely runs closely parallel to it. In any case, it is paramount that for the length of tape adjacent the bar, the only portion on which information can actually be recorded, there be no movement relative to the body 48.

A series of pulses are shown schematically on the upper surface of the body 48, with their current amplitude (I) shown vertically and their spacing in time horizontally. Thus, spikes having a maximum width of 1 millisecond corresponding to an apparent frequency($f_{apparent}$) of 500 Hz, and spaced at 20 milliseconds from each other, a cadence frequency ($f_{cadence}$) of 50 Hz, are passed through the body 48 longitudinally. These spikes will therefore manifest themselves every time the body moves through 10 millimeters. Since here $V_{max}$ divided by L equals 16.6/second, or 16.6 Hz, the cadence frequency is three times that which is the minimal value necessary according to the present invention. Theoretically, the foot 51 need merely have a longitudinal length L of 10 millimeters.

Figure 4:
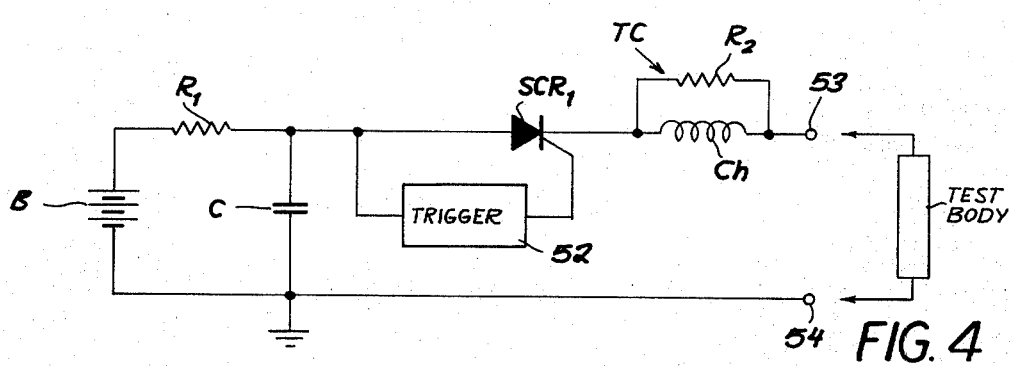
FIGS. 4 and 5 show alternative circuit arrangements usable in carrying out the method of the present invention.

FIG. 4 shows a circuit able in generating direct-current voltage pulses of the general type needed in carrying out the present invention. A direct-current voltage source B is connected in series with a current-limiting resistor $R_1$, with a capacitor C connected across the resistor $R_1$ and battery B. A silicon controlled rectifier $SCR_1$ has its anode connected to the capacitor-resistor junction and its cathode connected through a weakly damped tuned circuit TC constituted by a choke C$h$ and a resistor $R_2$ to a terminal 53. Another terminal 54 is connected to ground. A trigger circuit 52 is connected between the anode and gate of the control rectifier $SCR_1$. The test body is connected between the terminals 53 and 54. The capacitor C will charge at a rate determined by the resistor $R_1$, and will be periodically discharged when the trigger 52 opens the rectifier $SCR_1$. The voltage passing through this rectifier will back up in the weakly damped tuned circuit TC and, once there is no longer a voltage differential across $SCR_1$, this rectifier will shut down until triggered again. At the same time a voltage pulse of generally sinusoidal form and having an apparent frequency determined by the components $R_1$, $R_2$, C$h$ and C and a cadence frequency determined by the trigger 52 will be passed through the body.

Assuming that the circuit above described is built to give the pulse train described in relation to FIG. 3, it has been found through Fourier analysis that the direct-current component of this pulse train is only 3.2 percent of the pulse amplitude. A broad spectrum of harmonics of the 50 Hz basic oscillation determines the skin effect. The 50-Hertz component is 6.35 percent while the 1,200-Hertz component is less than 1 percent of the pulse amplitude. Thus, the direct-current component used is surprisingly small so that a unit adapted to deliver pulses of around 2,000 amperes need only draw a current of around 7 amperes to sufficiently charge up its capacitor C. The use of such a small amount of actual energy substantially completely eliminates a drop in sensitivity toward the edge of a side of an irregularly dimensioned test body.

Figure 5:
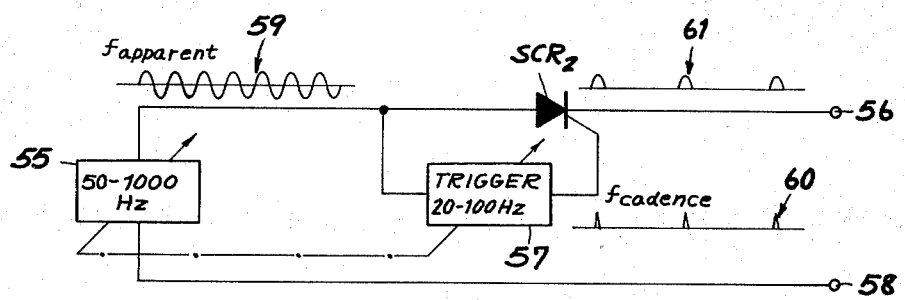

In FIG. 5 there is shown a circuit having an alternating-current signal source 55 adjustable between 50 and 1,000 Hz. A silicon-controlled rectifier $SCR_2$ is provided between one side of this source 55 and a terminal 56, with a trigger 57 connected between its gate and anode. Another terminal 58 is connected to the other side of the source 55. The trigger 57 is adapted to emit pulses 60 of extremely short duration, several microseconds, at a cadence frequency of between 20 and 100 Hz. The source 55 and trigger 57 are connected together in such a manner that the spikes emitted by the trigger 57 always fall within the time span of a positive pulse of the wave 59 emitted by the source 55. In this manner the source 55 defines the apparent frequency and the trigger 57 defines the cadence frequency of the pulse train shown at 61.

An elongated test body known to have few or no faults is connected between the terminals 56 and 58, one connected at each end. The frequency $f_{cadence}$ of source 57 is set consistent with the formula, $$f_{cadence} \geq V_{max}/L,$$

and the source 55 is set such that $f_{apparent}$ is equal to the lowest possible integral multiple of $f_{cadence}$ can produce. A reading is taken circumferentially around the body with a magnetic field strength meter as shown at 60 in FIG. 2 to determine the field-strength variation. Thereafter the source 55 is adjusted to increase $f_{apparent}$ as a harmonic of $f_{cadence}$ and field-strength readings are taken with each setting. It will be found that at a particular $f_{apparent}$ the field-strength variation will be smallest, the field at its strongest point somewhere around the circumference of the body will be only nominally stronger than at the weakest point; above and below this frequency the differential will increase. The setting thus determined, all of the workpieces with the same cross section and composition like (conductivity and permeability) are tested with the sources 55 and 57 as set.

This adjustment operation is carried out on a stationary test body, and the speed at which the subsequent test bodies are to be displaced is known and taken into account in the original calculation of the cadence frequency.

These settings can be carried out automatically by a simple computer system as a first perfect body with no faults is moved through the testing station. In this case, the perfect test body is placed at the head of the row and, as it is passed through the heads and is scanned thereby, the control circuits adjust the two sources to achieve the most useful output-signal level.

With such a system, the extreme difficulties in using magnetographic fault-detection systems on noncircular workpieces are almost entirely eliminated. Virtually any test body of regular cross section can be quickly and accurately tested.

SPECIFIC EXAMPLE

A steel billet of substantially square cross section and with rounded corners having a radius of curvature equal to around one-tenth the width of each side is moved through the installation shown in FIG. 2 at 0.5 meter per second. A detecting unit as shown in FIG. 3 extends longitudinally along 30 millimeters of the bar, engaging it lightly with the magnetic tape. A pulse train having a cadence frequency of 50 Hertz is used, this being three times the minimum frequency necessary according to the invention. A field of 80 Oersted was detected at the center of one side, and it was found that with an apparent frequency of around 500 Hertz the field strength at the neighboring corner was at a maximum, above and below this apparent frequency the field strength at the corner dropped off. A pulse amplitude of 2,000 amperes was used. In this manner upwards of 150 billets of 10 meter length can be tested in an hour. Of course, detecting heads are provided for each face of the bar and each head extends transversely over each respective face or side.

We claim:

1. A method of detecting faults comprising the steps of:
    relatively longitudinally displacing an elongated metallic body of noncircular regular cross section and a detecting unit at a predetermined rate;
    displacing a magnetic tape at said unit longitudinally along said body with said tape closely juxtaposed with said body only along a predetermined longitudinal distance, said tape and said body moving at the same rate in the same direction with no relative displacement through said distance;
    passing a train of unidirectional electric pulses longitudinally through said body with a cadence frequency at least equal to the rate of relative displacement of said tape and said body divided by said longitudinal distance to generate a magnetic field along the surface of said body with an intensity and uniformity modified by any faults; and
    recording on said tape the magnetic field generated by said pulse train.

2. The method defined in claim 1 wherein said cadence frequency is between 20 Hz and 50 Hz.

3. The method defined in claim 1 wherein said predetermined rate is above 0.5 meter per second.

4. A method of detecting surface faults comprising the steps of:
    passing a train of unidirectional pulses longitudinally through an elongated metallic body of noncircular regular cross section;
    measuring the magnetic field produced by said pulses on the surface of said body at a plurality of locations therearound while varying the apparent frequency of said pulses between about 20 Hz and about 1,000 Hz;
    establishing in the pulse train an apparent frequency of said pulses corresponding substantially to the apparent frequency at which magnetic field strength varies the least around said body;
    relatively longitudinally displacing said body and a detecting unit at a predetermined rate;
    displacing a magnetic tape at said unit longitudinally along said body with said tape closely juxtaposed therewith only along a predetermined longitudinal distance, said tape and said body moving at the same rate in the same direction with no relative displacement throughout said distance; and
    recording the magnetic field as said tape.

5. The method defined in claim 4 wherein said pulse train has a cadence frequency at least equal to the rate of relative displacement of said unit and said body divided by said longitudinal distance.

6. The method defined in claim 5 wherein said apparent frequency is several hundred Hz.

7. An apparatus for the nondestructive testing of a noncircular, regular cross section solid bar, comprising a magnetic detecting head provided with a magnetic band; means for relatively displacing said head and said bar at a predetermined longitudinal velocity; means for displacing said band along a surface of said bar in the same longitudinal direction and at an identical velocity; means for passing a train of unidirectional electrical pulses having a predetermined apparent frequency through said bar longitudinally with a cadence frequence less than said apparent frequency and at least equal to the quotient of said velocity and the longitudinal distance over which said band lies along said bar, thereby recording magnetic field anomalies on said band; and means for reading said band.

* * * * *